(12) United States Patent
Fisher

(10) Patent No.: US 10,357,978 B2
(45) Date of Patent: Jul. 23, 2019

(54) VALVE

(71) Applicant: HP INDIGO B.V., Amstelveen (NL)

(72) Inventor: Gil Fisher, Shoham (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/848,373

(22) Filed: Dec. 20, 2017

(65) Prior Publication Data

US 2018/0111384 A1    Apr. 26, 2018

Related U.S. Application Data

(63) Continuation of application No. 15/114,333, filed as application No. PCT/EP2014/051549 on Jan. 27, 2014, now Pat. No. 9,878,556.

(51) Int. Cl.
| | |
|---|---|
| *B41J 2/185* | (2006.01) |
| *F16K 11/20* | (2006.01) |
| *B41J 2/03* | (2006.01) |
| *F16K 99/00* | (2006.01) |
| *F16K 31/00* | (2006.01) |
| *B41J 2/02* | (2006.01) |

(52) U.S. Cl.
CPC .............. *B41J 2/185* (2013.01); *B41J 2/03* (2013.01); *F16K 11/20* (2013.01); *F16K 31/004* (2013.01); *F16K 99/0005* (2013.01); *F16K 99/0028* (2013.01); *F16K 99/0048* (2013.01); *B41J 2002/022* (2013.01); *B41J 2002/031* (2013.01); *B41J 2002/1853* (2013.01); *B41J 2202/05* (2013.01); *F16K 2099/0092* (2013.01)

(58) Field of Classification Search
CPC ... B41J 2/185; B41J 2/03; F16K 11/20; F16K 3/004

See application file for complete search history.

(56) References Cited

U.S. PATENT DOCUMENTS

| | | | |
|---|---|---|---|
| 4,072,959 A | | 2/1978 | Elmqvist |
| 4,190,844 A | * | 2/1980 | Taylor ........................ B41J 2/09 |
| | | | 347/82 |

(Continued)

FOREIGN PATENT DOCUMENTS

| | | |
|---|---|---|
| CN | 1265624 | 9/2000 |
| CN | 1500635 | 6/2004 |

(Continued)

OTHER PUBLICATIONS

Fillmore, G.L., et al; "Drop Charging and Deflection in an Electrostatic Ink Jet Printer"; Jan. 1977; pp. 37-47; http://ieeexplore.ieee.org/stamp/stamp.jsp?arnumber=5391065.

*Primary Examiner* — Jason S Uhlenhake
(74) *Attorney, Agent, or Firm* — Fabian VanCott

(57) ABSTRACT

A valve comprises an orifice plate (1) having one or more orifices (4) through which a fluid may flow, and one or more piezo-electric elements (2). Each element (2) has a face positioned to contact the orifice plate at an orifice. Each element has a first state in which it abuts the plate to prevent flow of fluid through the associated orifice and a second state in which the face is spaced from the plate to allow flow through the associated orifice. A controller (50) selectively applies a first voltage to an elements to cause it to adopt the first state and applies a second voltage to the one or more elements to cause the elements to adopt the second state.

20 Claims, 9 Drawing Sheets

(56) References Cited

U.S. PATENT DOCUMENTS

| | | | |
|---|---|---|---|
| 4,914,522 A | 4/1990 | Duffield et al. | |
| 6,371,604 B1* | 4/2002 | Yamane | B41J 2/14024 |
| | | | 347/50 |
| 6,511,164 B1 | 1/2003 | Bajeux | |
| 6,554,389 B1 | 4/2003 | Hawkins et al. | |
| 6,746,108 B1 | 6/2004 | Jeanmaire | |
| 8,011,764 B2 | 9/2011 | Hawkins et al. | |
| 8,540,351 B1 | 9/2013 | Love et al. | |
| 2001/0002136 A1 | 5/2001 | Usui et al. | |
| 2002/0175975 A1* | 11/2002 | Mitsuhashi | B41J 2/14233 |
| | | | 347/70 |
| 2007/0257971 A1* | 11/2007 | Jeanmaire | B41J 2/03 |
| | | | 347/82 |
| 2013/0278689 A1* | 10/2013 | Sowinski | B41J 2/105 |
| | | | 347/90 |
| 2013/0314462 A1 | 11/2013 | Ikegawa et al. | |

FOREIGN PATENT DOCUMENTS

| | | |
|---|---|---|
| CN | 103419492 | 12/2013 |
| DE | 20116515 U1 | 12/2001 |
| DE | 102004011923 | 9/2005 |
| EP | 0443628 A2 | 8/1991 |
| GB | 1521874 A | 8/1978 |
| JP | S-63303750 A | 12/1988 |
| WO | WO-9507765 | 3/1995 |

\* cited by examiner

VALVE

BACKGROUND

Some applications of valves require a valve which is small and operable at high frequency. One example, amongst others, of such an application is an air valve array for a fluid dispenser for example an ink jet printer.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1A:
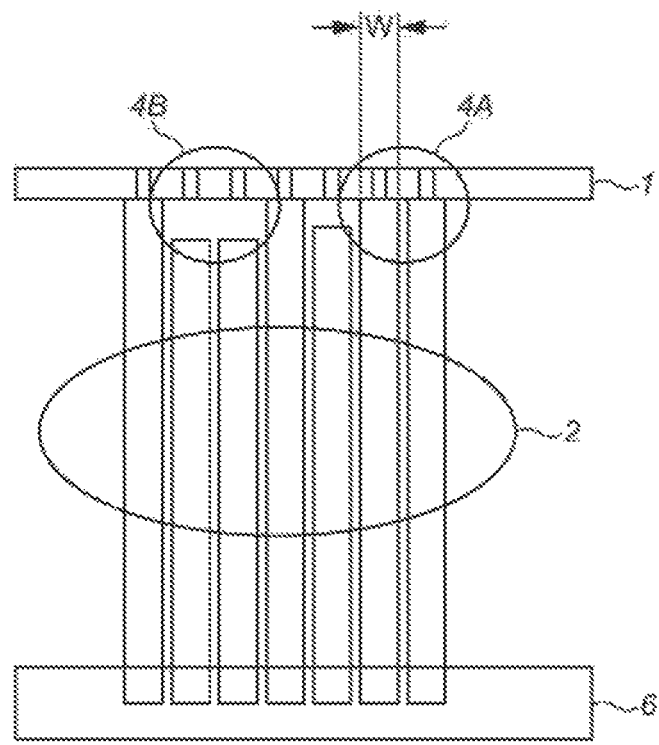
FIG. 1A is a schematic diagram of an example of a valve.

Referring to FIG. 1A, the valve comprises an orifice plate 1 and a plurality of elongate piezoelectric elements 2 supported by a support 6. The orifice plate 1 defines a plurality of orifices 4, one for each piezo-electric element 2, through which a fluid may flow. In examples described below the fluid is gas. Each piezo-electric element 2 has electrodes (not shown) arranged in known manner relative to the polarity of the element to cause the length of the element 2 to change linearly in a direction perpendicular to the orifice plate 1 when a voltage is applied to the electrodes. In one state, an element 2 abuts the orifice plate 1 and blocks the orifice (indicated by 4A for example) associated with it and in another state the element is spaced from the orifice plate 1 and thus the associated orifice (indicated by 4B for example) is not blocked.

Figure 1B:
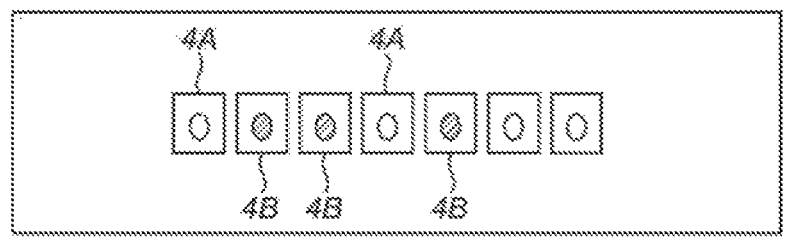
FIG. 1B is a schematic end view of an orifice plate of the valve of FIG. 1A.

As will be described hereinbelow, such a valve may have very small dimensions; for example there may be ten to twenty or more piezoelectric elements per mm. The valve can operate at high frequency; some examples operate at 250 kHz. A piezo-electric element of PMN-PT (Lead Magnesium Niobate-Lead Titanate) may change in length by 4 micrometers in 4 microseconds with an applied voltage of 60V. Whilst the example of FIG. 1 has a plurality of piezo-electric elements and orifices, it will be appreciated that a valve could have only one element and one orifice. Furthermore, whilst the example of FIG. 1 shows for simplicity only seven piezo-electric elements 2 and orifices 1, the valve may have any other number of elements and orifices. For example the valve may have hundreds of elements and orifices. Examples of the valves may have 10 to 20 orifices per mm. The orifices may have a diameter of 10 to 50 micrometers. In an example the orifices have a diameter of 40 micrometers. The width W of each piezo-electric element may be 40 to 80 micrometers.

Figure 2A:
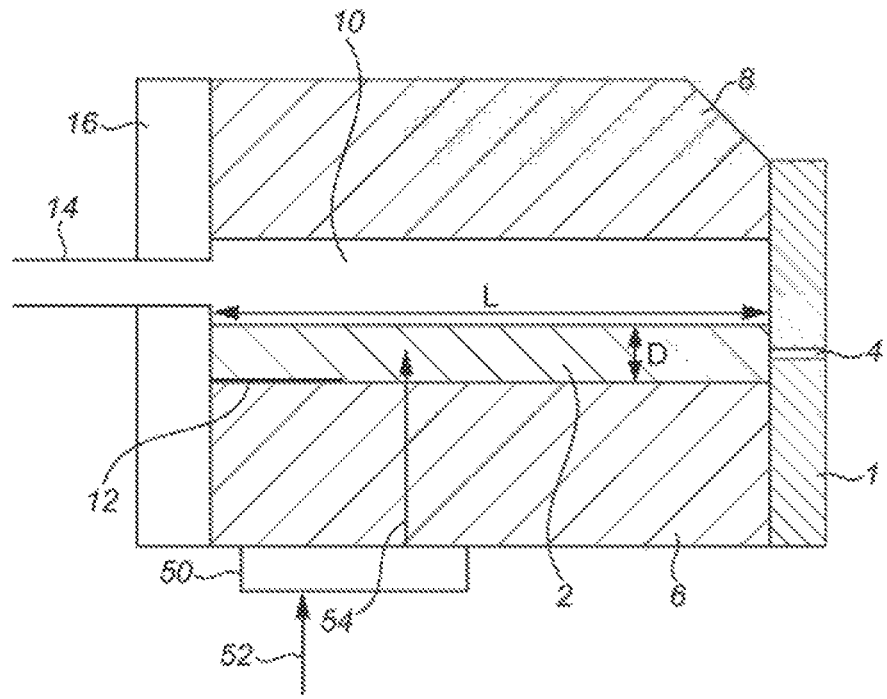
FIG. 2A is a schematic cross sectional view of the valve of FIG. 1 with the valve closed and FIG. 2B is a partial view showing the valve open.
Figure 2B:
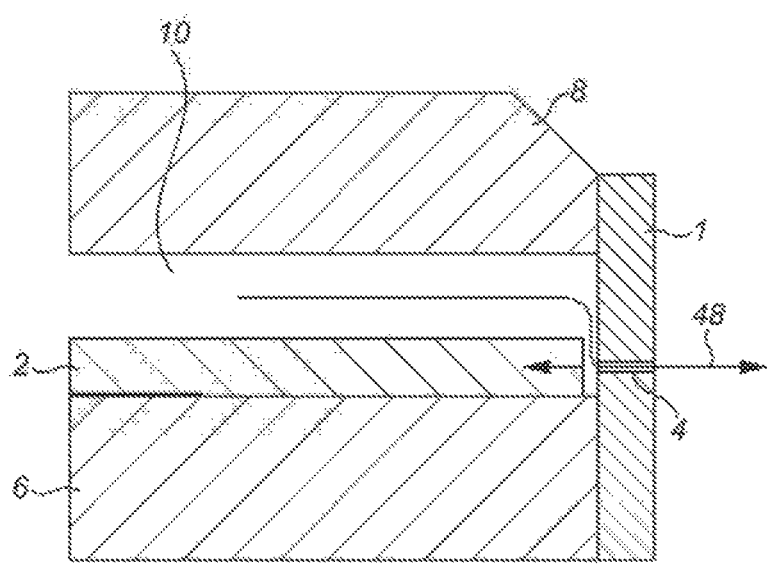

Referring to FIGS. 2A and 2B, an example of the valve comprises a closed chamber 10 defined by a support 6, the orifice plate 1, a hood 8, an end wall 16 opposite the orifice plate, and lateral end walls (not shown) which extend between the orifice plate and the end wall. The orifice plate 1, hood 8 and support 6 may be of any suitable stiff material for example silicon, stainless steel, beryllium copper, or other metals. In an example of the valve, the orifice plate is of silicon. The support 6 supports at least one, in this example a plurality of, piezo-electric elements 2 within the chamber 10. Each element 2 is fixed to the support at one end remote from the orifice plate 1, the remainder of the element being free to move, sliding on the support 6, to block and unblock an orifice in the plate 1. In the example of FIGS. 2A and 2B, the piezo-electric element is fixed to the support by adhesive. The chamber has an inlet port 14 in this example for supplying pressurized gas, in this example air, from a source (not shown) to the chamber 10. An actuating voltage is applied to each element 2 by an actuator 50 coupled to the electrodes of the piezo-electric element 2 by conductors 54. In a first state of the actuating voltage the piezo-electric element 2 abuts the orifice plate 1 and blocks its associated orifice as shown in FIG. 2A. In a second state of the actuating voltage the piezo-electric element 2 is spaced from the orifice plate 1 and the pressurized air exits the chamber through the orifice as an air jet as shown in FIG. 2B.

The actuator 50 may be responsive to control signals 52 from a control device for example a computer which controls the operation of the valve.

Figure 3A:
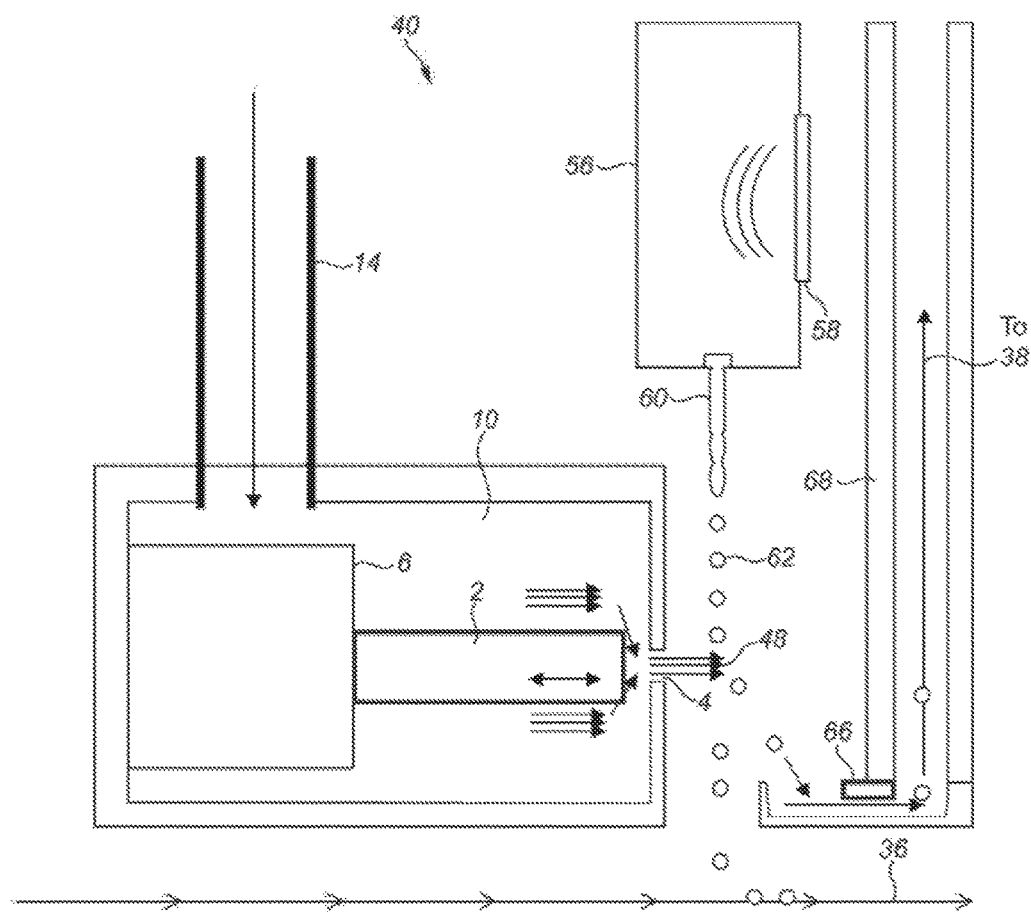
FIG. 3A is a schematic view of a fluid dispenser including the valve of FIG. 2 open and FIG. 3B shows the fluid dispenser with the valve closed.
Figure 3B:
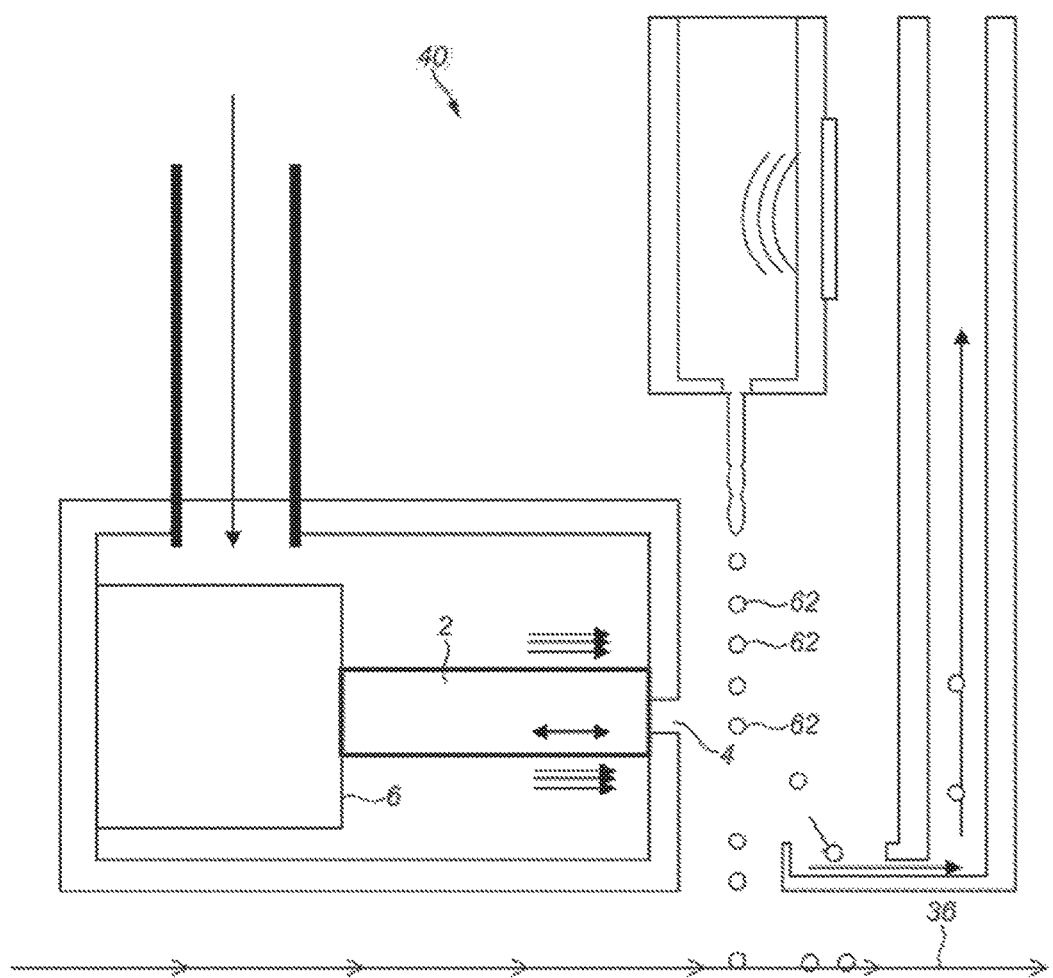

Referring to FIGS. 3A and 3B, the valve may be used in a fluid ejection system which in this example is an ink jet printer. FIGS. 3A and 3B schematically show, for simplicity, one section, associated with one piezoelectric element 2 and one orifice 4, of a print head 40. The print head comprises one or more valves.

The section of the print head 40 shown in FIGS. 3A and 3B comprises a source 56 of ink which supplies ink under pressure to a nozzle 60. The source 56 and nozzle 60 are vibrated by a vibrator 58 which may be a piezoelectric vibrator to create ink drops 62 which are jetted towards a print medium 36. The ink drops are jetted along a drop path past the valve before they reach the print medium 36. When the orifice 4 is not blocked as shown in FIG. 3A, an air jet 48 diverts one or more drops into a gutter 66 for recirculation back to an ink reservoir (38 in FIG. 9) via a suction tube 68. When the orifice is blocked as shown in FIG. 3B, the drops are not diverted and reach the print medium. The print medium and the print head move one relative to the other and drops are allowed to reach the print medium or be diverted to the gutter under the control of a data source to print desired indicia on the medium 36 as will be described with reference to FIG. 9.

Figure 4A:
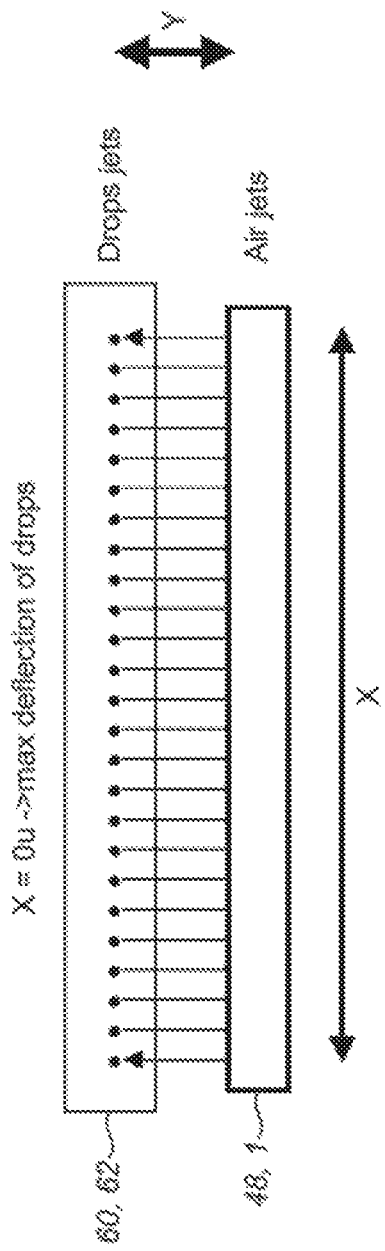
FIGS. 4A and 4B are schematic diagrams showing relative positions of the orifice plate and fluid drops.
Figure 4B:
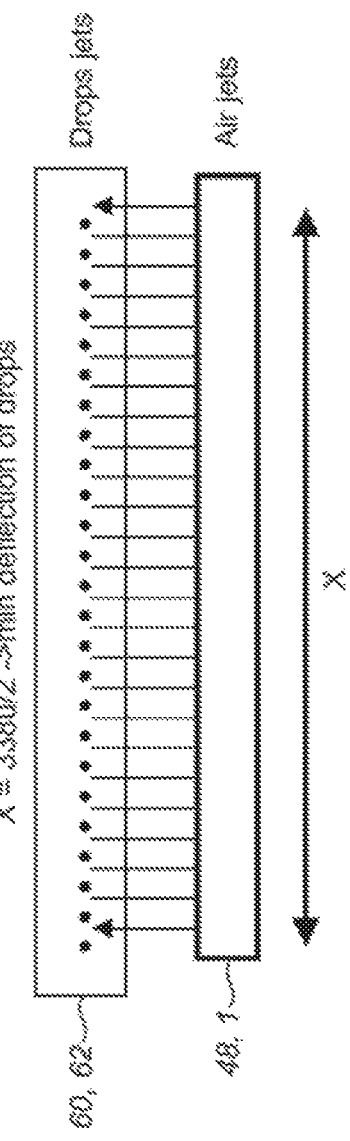

Referring to FIGS. 4A and 4B, an example of the print head 40 (see FIG. 3A) has a plurality of nozzles 60 and a like plurality of orifices 4 and piezo-electric elements 2. In an example, each nozzle is arranged to produce drops of fluid having a volume of about 14 picolitres at a rate of 135 KHz. The orifices in the orifice plate have a diameter of about 18 micrometers and are spaced by 338/2=169 micrometers. Air is supplied to the chamber 10 (see FIG. 3A) at a pressure of about 0.45 bar producing air jets when the orifices 4 are open of about 1.5 bar. FIG. 4A shows the air jets 48 aligned with the drops and FIG. 4B shows the air jets 48 offset in the X direction, the direction of the path of the drops, from the drops by 338 micrometers. The orifice plate is spaced from the drop path by the spacing Y.

Figure 5:
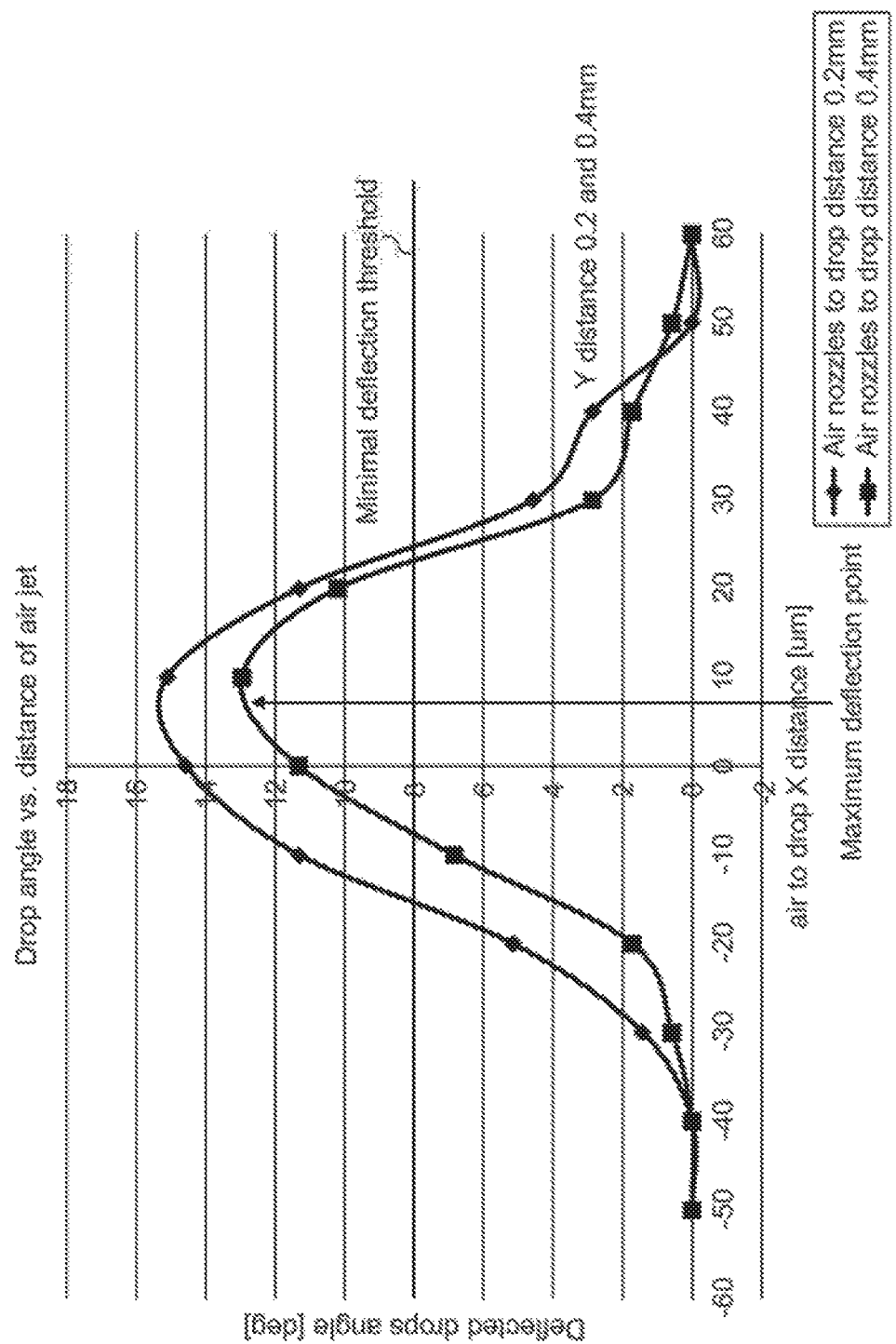
FIG. 5 is a graph showing the relationship of droplet deflection and relative position of the orifice plate and fluid drops.
Figure 6:
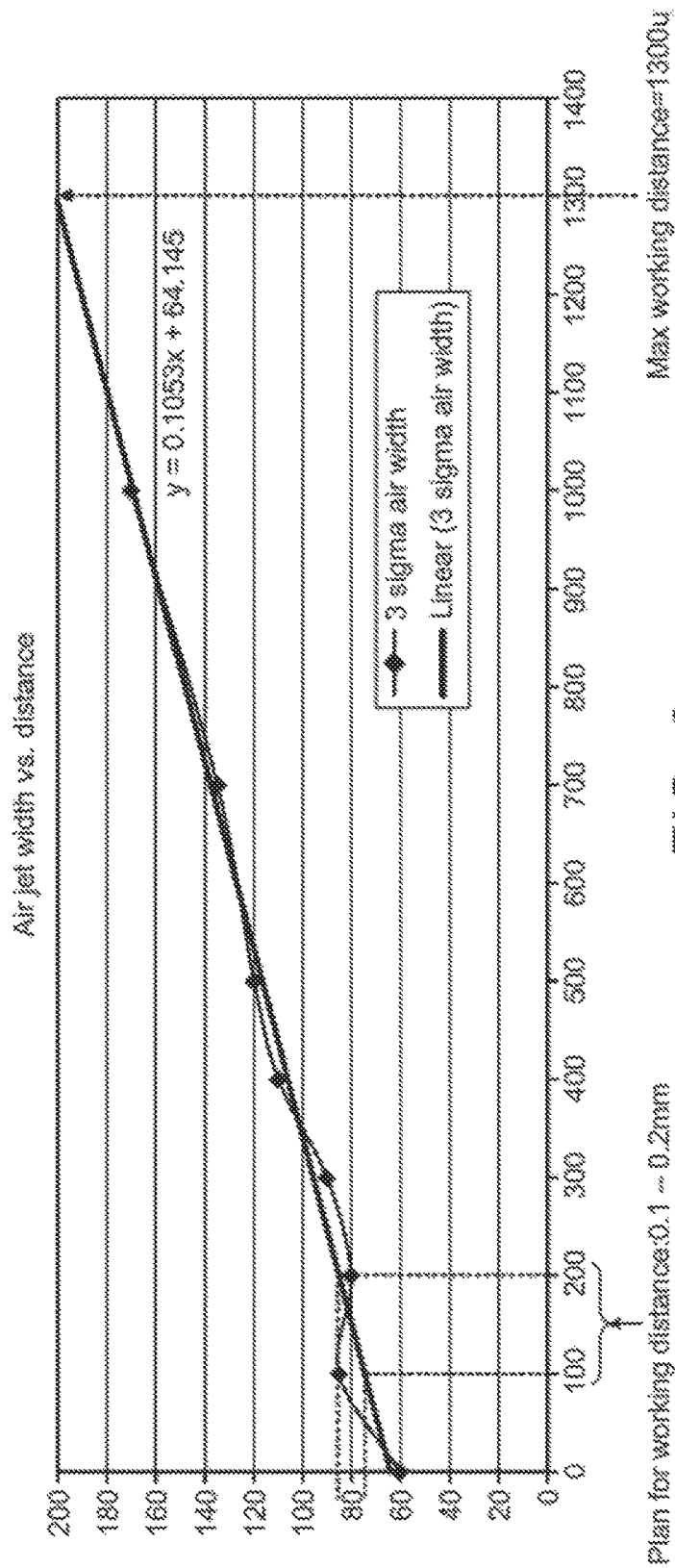
FIG. 6 is a graph showing the variation of the width of an air jet with distance from the orifice plate.
Figure 7:
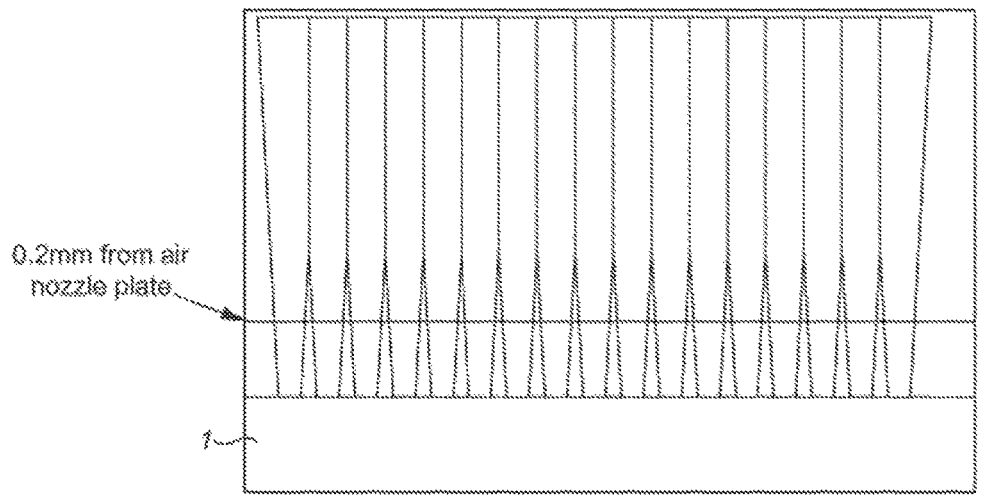
FIG. 7 is a schematic diagram showing air jets produced by the orifice plate.
Figure 8:
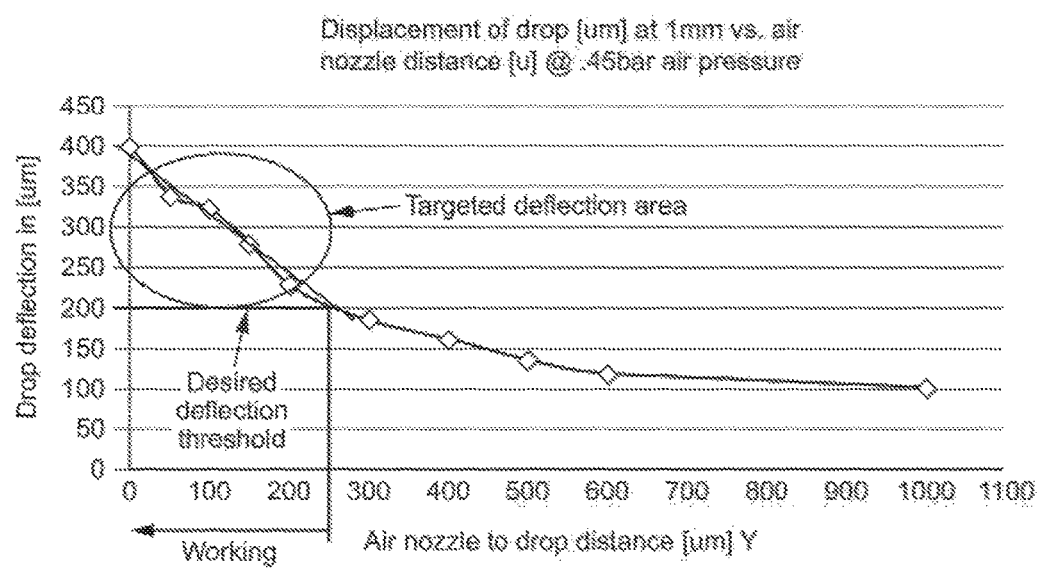
FIG. 8 is a graph showing the variation of droplet displacement with distance from the orifice plate.

FIG. 5 is an example graph showing the variation in angle of drop deflection with direction X for two values of Y, 0.2 mm and 0.4 mm. FIG. 7 is an example graph showing the width of an air jet with distance from the orifice plate. FIG. 6 shows, consistently with FIG. 5, a working range of value Y of 0.1 mm to 0.2 mm. FIG. 7 shows that at 0.2 mm form the orifice plate the air jets 48 do not overlap minimizing cross talk between adjacent orifices. FIG. 8 is an example graph showing the variation with orifice to drop distance Y of drop deflection at 1 mm from the drop plate. It shows that over the working range of Y=0.1 to 0.2 mm the deflection varies approximately linearly.

In one example, the number of orifices and of piezoelectric elements in a valve is selectable by the designer. An array of a plurality of valves each comprising one or more orifices and piezoelectric elements may be used in one print head.

The dimensions and spacing of the orifices and of the piezoelectric elements is selectable by the designer. In practice, the dimensions and spacing may be limited by the chosen method of making the piezo-electric elements. In one example the elements are made by mechanically cutting a piezo-electric crystal which provides a minimum spacing between adjacent elements of about 10 micrometers. Referring to FIGS. 1 and 2, illustrative dimensions for a piezoelectric element are 5 mm long (L perpendicular to the orifice plate 1), 0.1 mm thick (D) and 0.08 mm wide (W parallel to the orifice plate) for an orifice 4 of diameter less than 0.08 mm. Such dimensions are suitable for printing at a resolution of about 250 dots per inch (dpi) using 10 piezo-electric elements and orifices per mm. With other methods of making the elements, smaller dimensions may be achieved.

Figure 9:
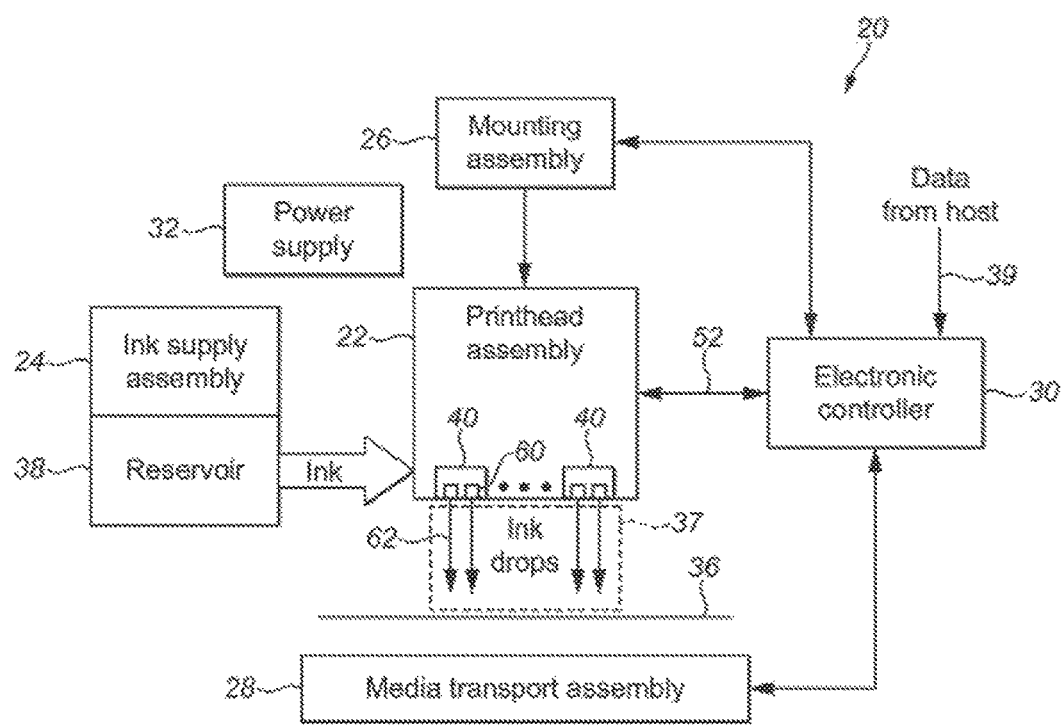
FIG. 9 is a schematic diagram of a fluid dispensing apparatus.

FIG. 9 schematically shows an example of an inkjet printing system 20 using the valve described herein above. The inkjet printing system 20 constitutes one example of a fluid ejection system that includes a fluid ejection device, such as inkjet print head assembly 22, and a fluid supply assembly, such as ink supply assembly 24. The inkjet printing system 20 also includes a mounting assembly 26, a media transport assembly 28, and an electronic controller 30. At least one power supply 32 provides power to the various electrical components of inkjet printing system 20.

In one example, inkjet print head assembly 22 includes one or more print heads 40 as described above that eject drops of ink through a plurality of nozzles 60 toward a print medium 36 so as to print onto print medium 36.

Print medium 36 may be any type of suitable sheet material, such as paper, card stock, transparencies, Mylar, fabric, and the like.

Typically, nozzles 60 are arranged in one or more columns or arrays such that properly sequenced ejection of ink from nozzles 60 causes characters, symbols, and/or other graphics or images to be printed upon print medium 36 as inkjet print head assembly 22 and print medium 36 are moved relative to each other. While the following description refers to the ejection of ink from print head assembly 22, it is understood that other liquids, fluids or flowable materials, including clear fluid, may be ejected from print head assembly 22.

Ink supply assembly 24 as one example of a fluid supply assembly 30 provides ink to print head assembly 22 and includes a reservoir 38 for storing ink. As such, ink flows from reservoir 38 to inkjet print head assembly 22. Ink supply assembly 24 and inkjet print head assembly 22 form a recirculating ink delivery system as described above. In a recirculating ink delivery system as shown in FIGS. 3A and 3B, only a portion of the ink provided to print head assembly 22 is consumed during printing. Ink not consumed during printing is returned to ink supply assembly 24.

In one example, inkjet print head assembly 22 and ink supply assembly 24 are housed together in an inkjet cartridge or pen. The inkjet cartridge or pen is one example of a fluid ejection device. In another example, ink supply assembly 24 is separate from inkjet print head assembly 22 and provides ink to inkjet print head assembly 22 through an interface connection, such as a supply tube (not shown). In either example, reservoir 38 of ink supply assembly 24 may be removed, replaced, and/or refilled. In one example, where inkjet print head assembly 22 and ink supply assembly 24 15 are housed together in an inkjet cartridge, reservoir 38 includes a local reservoir located within the cartridge and may also include a larger reservoir located separately from the cartridge. As such, the separate, larger reservoir serves to refill the local reservoir, for example source 56 of FIG. 3. Accordingly, the separate, larger reservoir and/or the local reservoir may be removed, replaced, and/or refilled.

Mounting assembly 26 positions inkjet print head assembly 22 relative to media transport assembly 28 and media transport assembly 28 positions print medium 36 relative to inkjet print head assembly 22. Thus, a print zone 37 is defined adjacent to nozzles 60 in an area between inkjet print head assembly 22 and print medium 36.

In one example, inkjet print head assembly 22 is a scanning type print head assembly. As such, mounting assembly 26 includes a carriage (not shown) for moving inkjet print head assembly 22 relative to media transport assembly 28 to scan print medium 36. The assembly 26 comprises for example a print head 40 having a plurality of orifices 4 and piezo-electric elements 2 extending in the direction of movement of the print medium. The carriage scans the print head 40 across the print medium to simultaneously print a plurality of lines across the medium.

In another example, inkjet print head assembly 22 is a non-scanning type print head assembly. As such, mounting assembly 26 fixes inkjet print head assembly 22 at a prescribed position relative to media transport assembly 28. Thus, media transport assembly 28 positions print medium 36 relative to inkjet print head assembly 22. The assembly comprises a fixed array of print heads extending perpendicular to the direction of movement of the print medium. Each print head comprises a plurality of drop sources, orifices 4 and piezo-electric elements 2 arranged to simultaneously print on the print medium 36.

Electronic controller or printer controller 30 typically includes a processor, firmware, and other electronics, or any combination thereof, for communicating with and controlling inkjet print head assembly 22, mounting assembly 26, and media transport assembly 28. Electronic controller 30 receives data 39 from a host system, such as a computer, and usually includes memory for temporarily storing data 39. Typically, data 39 is sent to inkjet printing system 20 along an electronic, infrared, optical, or other information transfer path. Data 39 represents, for example, a document and/or file to be printed. As such, data 39 forms a print job for inkjet printing system 20 and includes one or more print job 10 commands and/or command parameters.

In one example, the controller 30 sends control data 52 to the actuating device 50 shown in FIG. 2A to actuate the valve and to control which drops 62 reach the print medium 36. As such, electronic controller 30 defines a pattern of ejected ink drops that form characters, symbols, and/or other graphics or images on print medium 36. The pattern of ejected ink drops is determined by the print job commands and/or command parameters.

The piezo-electric elements of the examples described above are of PMN-PT but other examples could use other piezo-electric materials for example PZT (Lead Zirconium Titanate). PMN-PT allows higher frequency operation and allows smaller dimensions to be achieved than other materials currently available. The piezo electric elements described above have a rectangular cross section, but could have other cross-sectional shapes. The piezoelectric elements described above change length linearly to block and unblock the orifices 4. In other examples, the elements may bend to block and unblock the orifices but such a mode of operation is slower that changing length linearly.

The valve of FIGS. 1 and 2 may be used for purposes other than in a fluid ejection system as described with reference to FIGS. 3 to 9.

What is claimed is:

1. A printer comprising:
    a fluid source comprising a nozzle to eject drops from the fluid source;
    a gas jet along a path of drops ejected from the nozzle;
    a valve comprising a piezo electric device to block and unblock the gas jet;
    a controller to selectively operate the valve to deflect some drops ejected from the nozzle out of the path with the gas jet and to allow other drops ejected from the nozzle to follow the path to a print medium, wherein drops are selectively deflected or allowed to reach the print medium in accordance with data from a host device defining an image to be printed;
    wherein the gas jet comprises an inlet port to receive pressurized gas, the inlet port being out of line with an orifice to release a stream of gas, the piezo electric device being in-line with the orifice and not the inlet port.
2. The printer of claim 1, wherein:
    the gas jet comprises an orifice plate, the orifice being formed in the orifice plate and directing a flow of gas under pressure into the path of drops; and
    the piezo electric device of the valve moves linearly in a direction perpendicular to the orifice plate to selectively block or unblock the orifice to the flow of gas.
3. The printer of claim 1, further comprising a gutter to collect drops deflected from the path by the gas jet.
4. The printer of claim 3, further comprising a recirculating system to return drops from the gutter to the fluid source.
5. The printer of claim 1, further comprising a vibrator to eject drops from the fluid source via the nozzle.
6. The printer of claim 1, wherein:
    the fluid source comprises an array of nozzles;
    the gas jet comprises an orifice plate with an array of orifices, each orifice to direct a gas jet into a path of drops from a corresponding nozzle of the nozzle array, each orifice being controlled by a valve with a piezo electric device; and
    the controller to independently operate the piezo electric device in each of the valves for all of the gas jets in accordance with the data from a host device defining an image to be printed.
7. The printer of claim 6, wherein there are 10 to 20 orifices per millimeter in the orifice plate.
8. The printer of claim 6, wherein the orifices have a diameter in the range 10 to 50 micrometers.
9. The printer of claim 6, wherein the piezoelectric devices each have a width at the orifice plate in the range 40 to 80 micrometers.
10. The printer of claim 1, wherein the piezo-electric device comprises Lead Magnesium Niobate-Lead Titanate.
11. The printer of claim 1, further comprising a media transport assembly for moving a print medium through a print zone defined by the path of the drops ejected from the nozzle.
12. A system for selectively dispensing a liquid, the system comprising:
    a liquid source comprising a nozzle to eject drops from the liquid source;
    a gas jet along a path of drops ejected from the nozzle, the gas jet comprising an orifice in an orifice plate to emit a stream of pressurized gas into the path of drops ejected from the nozzle;
    a valve comprising a piezo electric device to expand and retract longitudinally to block and unblock the orifice of the gas jet, where the piezo electric device of the valve moves linearly in a direction perpendicular to the orifice plate to selectively block or unblock the orifice to the flow of gas;
    a controller to selectively operate the valve to deflect some drops ejected from the nozzle out of the path with the gas jet and to allow other drops ejected from the nozzle to follow the path to a target zone, wherein drops are selectively deflected or allowed to reach the target zone in accordance with data from a host device.
13. The system of claim 12, further comprising a gutter to collect drops deflected from the path by the gas jet.
14. The system of claim 13, further comprising a recirculating system to return drops from the gutter to the liquid source.
15. The system of claim 12, further comprising a vibrator to eject drops from the liquid source via the nozzle.
16. The system of claim 12, wherein the gas jet comprises an inlet port to receive pressurized gas, the inlet port being out of line with the orifice, the piezo electric device being in-line with the orifice and not the inlet port.
17. A method for selectively dispensing a liquid, the method comprising:
    ejecting drops from nozzles of a liquid source that comprises an array of nozzles;
    with a gas jet comprising an orifice plate with an array of orifices, each orifice being along a path of drops ejected from the array of nozzles, selectively emitting a stream of pressurized gas from an orifice of the gas jet into a corresponding path of drops ejected from the array of nozzles to deflect a drop out of a trajectory to a target zone of a print medium;
    with a controller, selectively applying a voltage to a piezo electric device of a valve of each orifice of the gas jet to expand and retract the piezo electric device longitudinally to block and unblock the corresponding orifice of the gas jet to deflect some drops ejected from the array of nozzles out of the path with the gas jet and to allow other drops ejected from the array of nozzles the path to the target zone, wherein drops are selectively deflected or allowed to reach the target zone in accordance with data from a host device.
18. The method of claim 17, further comprising collecting drops deflected from the path by the gas jet with a gutter.

19. The method of claim 18, further comprising recirculating drops from the gutter to the liquid source.

20. The method of claim 17, further comprising moving the array of nozzles relative to the array of orifices between positions providing maximum and minimum deflection of the drops.

* * * * *